United States Patent [19]

Crowe

[11] Patent Number: 4,788,448

[45] Date of Patent: Nov. 29, 1988

[54] POWER TRANSFER OF DIRECT CURRENT WITH INDUCTIVE COUPLINGS

[75] Inventor: Wayne D. Crowe, Houston, Tex.

[73] Assignee: Ferranti Subsea Systems, Ltd., England

[21] Appl. No.: 678,848

[22] Filed: Dec. 6, 1984

[51] Int. Cl.⁴ .......................................... H04M 11/04
[52] U.S. Cl. .................................... 307/31; 307/149; 340/310 A; 340/310 R
[58] Field of Search ............... 363/15, 34, 35; 307/31, 307/16, 17, 19, 12, 6, 7, 149; 340/345, 310 A, 310 R, 310 CP

[56] References Cited

U.S. PATENT DOCUMENTS

| | | | |
|---|---|---|---|
| 3,181,015 | 4/1965 | Way | 307/31 X |
| 3,414,798 | 12/1968 | Nielsen | 363/15 |
| 3,459,955 | 8/1969 | Hurlbert | 307/12 |
| 3,501,685 | 3/1970 | Reese et al. | 363/15 |
| 3,818,306 | 6/1974 | Marini | 363/15 |
| 3,863,140 | 1/1975 | Easter et al. | 363/15 X |
| 3,869,658 | 3/1975 | Hanke et al. | 363/15 |
| 3,893,015 | 7/1975 | Weil | 307/6 X |
| 4,130,861 | 12/1978 | LaForrest | 340/310 A |
| 4,136,327 | 1/1979 | Flanders et al. | 340/310 A X |
| 4,296,450 | 10/1981 | Paice et al. | 361/50 |
| 4,357,545 | 11/1982 | Le Grand et al. | 307/64 |
| 4,365,288 | 12/1982 | Robe et al. | 363/15 X |
| 4,413,250 | 11/1983 | Porter et al. | 340/310 A |
| 4,447,695 | 5/1984 | Inoue | 363/34 X |
| 4,639,714 | 1/1987 | Crowe | 340/310 A X |

FOREIGN PATENT DOCUMENTS

| | | | |
|---|---|---|---|
| 0083164 | 5/1982 | Japan | 363/15 |
| 0112462 | 7/1983 | Japan | 363/15 |
| 2091957 | 8/1982 | United Kingdom | 363/15 |

Primary Examiner—William M. Shoop, Jr.
Assistant Examiner—Paul Ip
Attorney, Agent, or Firm—Browning, Bushman, Zamecki & Anderson

[57] ABSTRACT

A source of DC electrical power (A) provides DC electrical power to a power transmission cable (B) which extends to a remote location, such as a subsea module (D). The power transmission cable is connected with a pair of rectifiers (20a, 20b), each allowing only power of a selected polarity to be passed thereby. A pair of DC to AC inverters (24a, 24b) convert the received electrical power to high frequency square waves which are applied across primary windings (32a, 32b) of inductive couplers (30a, 30b). Secondary windings (38a, 38b) of the inductive couplers convey the AC electrical power to remote module rectifiers (40a, 40a) for providing DC electrical power to the subsea module. In this manner, DC electrical power is transmitted along the power transmission cable to reduce interference and crosstalk, yet the electric power is transmitted across an inductive coupler to facilitate safe separation of the remote module from the power transmission cable.

14 Claims, 2 Drawing Sheets

POWER TRANSFER OF DIRECT CURRENT WITH INDUCTIVE COUPLINGS

BACKGROUND OF INVENTION

The present invention relates to the art of power transfer. Particular application is found in transmitting electrical power to undersea installations and will be described with particular reference thereto. It is to be appreciated, however, that the invention is also applicable to supplying power to other remote or relatively inaccessible locations, particularly under fluid locations, such as submersible pumps, downhole well equipment, or the like.

Heretofore, various techniques have been used for providing power to apparatus in undersea and other remote locations. Inductive-type couplers connected to a power transmission cable with the undersea apparatus to permit safe mating and uncoupling under water, even when powered.

Commonly, low frequency AC voltages were transmitted along the power cable to and across the inductive coupling. One of the problems with coupling lower frequency AC voltages was that a relatively large transformer core was required. Large, laminated steel coupler cores were subject to corrosion, particularly by salt water. Although coatings or nonmagnetic, corrosion-resistant barriers could inhibit corrision, they also increased the gap between the coupler halves, hence, reduced efficiency.

To correct this deficiency, others have transmitted high frequency AC voltages along the power transmission cables to the inductive coupler. Inductive couplers for higher frequencies could use ferrite-type pot cores which were relatively small and relatively immune to salt water corrosion. Moreover, the higher the frequency, the smaller the required core to transmit a given level of power. However, high frequency transmission techniques also had their drawbacks. First, the high frequency signals caused crosstalk from power to communication conductors located in the same cable. Further, high frequency transmissions attenuated more quickly than lower frequency transmissions, rendering the high frequency transmissions unsuitable for long distance power transfers.

The present invention provides an improved power transfer and inductive coupling system which overcomes the above-referenced disadvantages and others of the low and high frequency transmission techniques.

SUMMARY OF THE INVENTION

In accordance with the present invention, a method is provided for transmitting electrical power to equipment at a remote location. Electrical power is first transmitted from a source to the remote location, and is then passed through a rectifying means to assure that the electrical power is DC power and has a selected polarity. The DC electrical power is converted to high frequency AC electrical power and applied to one coil of an inductive coupler. The AC electrical power is transmitted across the inductive coupler and converted to an appropriate frequency, voltage level, and the like, for the remotely located equipment. Commonly, the current which has been transferred across the inductive coupler is rectified to provide DC electrical power for the remotely located equipment.

In accordance with another aspect of the present invention, apparatus is provided for transmitting electrical power to equipment at a remote location. A source of electrical power, preferably a DC electrical power source, is connected with an elongated power transmission cable to transmit electrical power therealong. At the remote location, the power transmission cable is connected with a rectifier which assures that the electrical power passing therethrough is DC power of a preselected polarity. A DC to AC inverter is connected with the rectifying means for converting the DC electrical power into high frequency AC electrical power. An inductive coupler is operatively connected with the DC or AC converter and with remotely located equipment for inductively transmitting power thereto.

One advantage of the present invention is that it allows relatively small inductive couplers to transfer electrical power with great efficiency.

Another advantage of the invention is that crosstalk between power and communication channels is eliminated.

Yet other advantages of the invention reside in its greater reliability attributable to redundant operation of power conversion and transfer paths, greater immunity to corrosion in seawater, improved transfer of energy across the coupler, simplified power transmission cable specifications, and the like.

Still further advantages will become apparent to those skilled in the art upon a reading and understanding of the following detailed description of the preferred embodiments.

BRIEF DESCRIPTION OF THE DRAWINGS

The invention may take physical form in various parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 1:
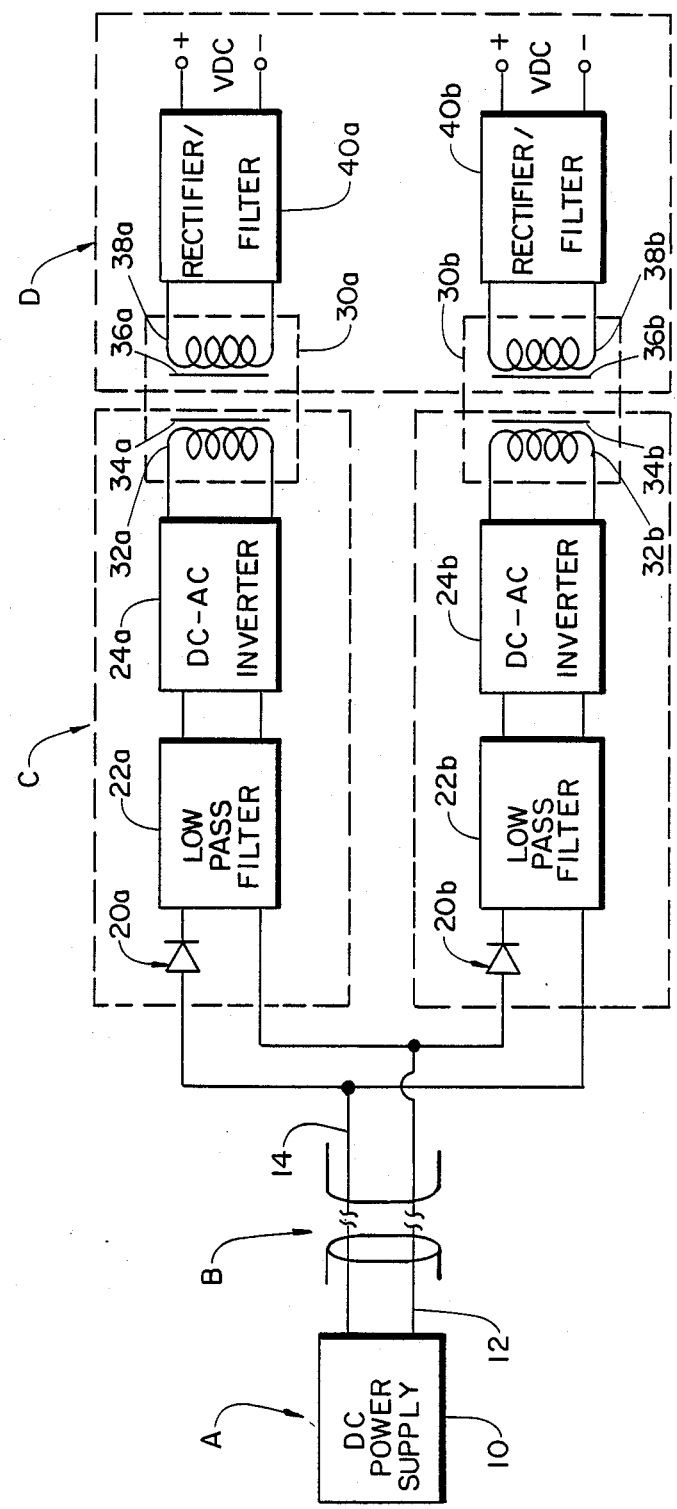
FIG. 1 is a schematic diagram of a circuit for transmitting electrical power to subsea modules or the like formed in accordance with the present invention.
Figure 2:
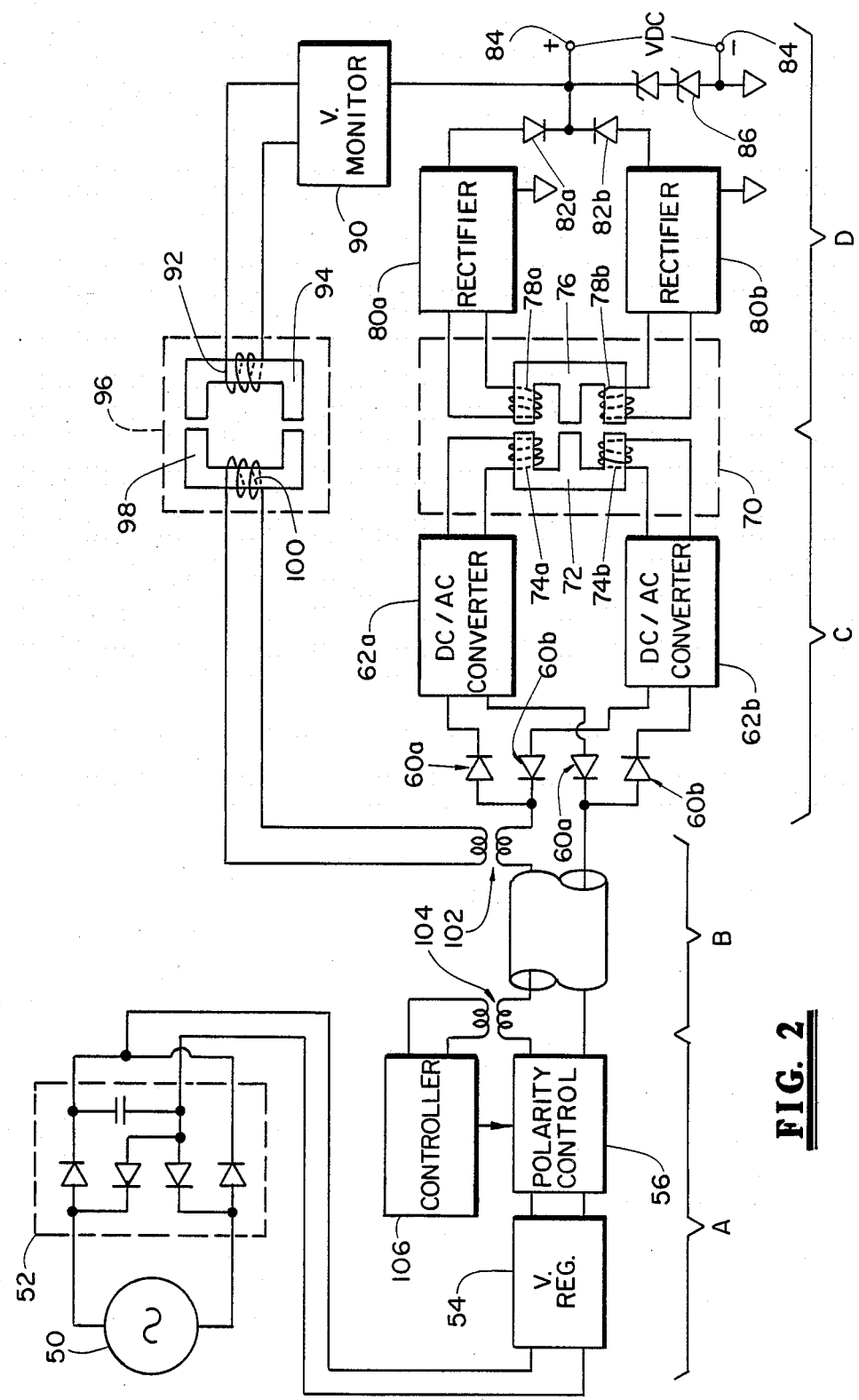
FIG. 2 is an alternate embodiment of a power transmission circuit formed in accordance with the present invention.

Referring now to the drawings wherein the showings are for purposes of illustrating preferred embodiments of the invention only and not for purposes of limiting same, FIGS. 1 and 2 show a source of electrical power A connected with an electrical power transmission cable B for transmitting the electrical power to a remote location. A remotely located end of the cable is connected with cable end coupler assembly C which converts the electrical power to an appropriate high frequency magnetic field for inductive transmission through a ferromagnetic core material, or the like. A subsea or other remote module D is inductively coupled with the cable end coupler assembly to receive the high frequency magnetic power therefrom.

With reference to FIG. 1, the electrical power source A includes a source of DC electrical power 10 which is operatively connected with the power transmission cable B. The power transmission cable includes electrical conductors 12, 14 which extend from the source of DC power to the cable end coupler assembly C at the remote, subsea location.

The cable end coupler assembly C includes a first rectifying means 20a connected with the electrical conductors to assure that the power transmitted therepast is DC power of a first selected polarity. A first low pass filter 22a removes any communications or stray AC signal components which may have become superimposed on the transmitted DC power signal. The low pass filter 22a also prevents high frequency components from the DC-AC inverter 24a from being induced onto the DC level on conductors 12 and 14 of cable. B. The filtered DC power is conveyed to a first DC to AC inverter 24a which converts the filtered DC power to AC power. Preferably, the AC power has a relatively high frequency. More specifically, the DC to AC inverter of the preferred embodiment converts the DC electrical power to a square wave alternating current with a frequency in the kilohertz range.

A first inductive coupler 30a interconnects the first DC to AC inverter with the remote module D. The first inductive coupler has a primary portion including a first power input or primary winding 32a wrapped around a first primary ferromagnetic pole member 34a. The first primary winding converts the high frequency electrical field into a corresponding high frequency magnetic field of substantially the optimum frequency for transmission through the selected ferromagnetic pole construction.

The first inductive coupler includes a secondary portion having a first secondary or magnetic field receiving pole member 36a and a first electrical power output or secondary winding 38a wrapped therearound which are mounted to the remote moduel D. The first primary ferromagnetic pole member 34a and the first secondary ferromagnetic pole member 36a are disposed to abut in a magentically coupled relationship. The first secondary winding 38a converts the high frequency magnetic field to a corresponding high frequency electrical current. The remote moduel D further includes a first rectifier and filter means 40a for converting the high frequency AC power from the first secondary winding 38a into an appropriate DC output for electronically controlled equipment, data acquisition systems, or the like.

The inductive coupler assembly C has a second transmission path including a second rectifier means 20b which permits the passage of DC electrical power of a second polarity therethrough. The first and second rectifier means pass DC power of opposite polarity such that selecting the polarity at the DC power source selects the power transmission path.

A second low pass filter 22b filters stray AC components from the transmitted DC power provided to a second DC to AC inverter 24b. The low pass filter 22a also prevents high frequency components from the DC-AC inverter 24a from being induced onto the DC level on conductors 12 and 14 of cable B. The second DC to AC inverter applies a high frequency AC signal to a second primary or power input winding 32b of a second inductive coupler 30b. A second primary magnetic pole member 34b and a second secondary or magnetic field receiving pole member 36b are magnetically interconnected such that power is inductively passed therebetween. A second output or secondary winding 38b provides AC electrical power to a second rectifier and filter means 40b of the remote module.

The use of a two-channel inductive coupler assembly C is amenable to various modes of operation. In a preferred mode, the second inductive coupler channel provides redundancy in case the other inductive coupler or associated electrical components should fail. Alternately, the first and second inductive couplers may be interconnected with different equipment in a subsea module so that the different equipment may be selectively operated. Note that if a square wave of alternating polarity were applied to the power transmission cable B, the first and second inductive coupler assemblies would be alternately actuated with the periodicity of the alternating polarity square wave of the DC power transmission cable. If the rectifier and filter assemblies 40a and 40b of the subsea module included adequate power storage components, such as a large capacitor, both could supply sufficient DC output power to operate their associated equipment simultaneously.

In the embodiment of FIG. 2, the source of electrical power A includes an AC power supply 50, a full wave rectifier 52, and a voltage regulator 54. A polarity control 56 controls the polarity of the DC power applied to the power transmission cable B.

A first rectifying means 60a passes only electrical power of a first polarity to a DC to AC converter 62a. A second rectifier means 60b passes only electrical power of an opposite polarity to a second DC to AC converter 62b. The DC to AC converters convert the DC electrical power to high frequency square waves.

An inductive coupler 70 includes a primiary E-shaped ferromagnetic core member 72 having a first primary winding 74a and a second primary winding 74b wrapped around the legs thereof. The first and second primary windings are connected with the first and second DC to AC converters, respectively.

The inductive coupler further includes a secondary E-shaped ferromagnetic core member 76 that magnetically couples to the primary ferromagnetic core member 72. Legs of the secondary E-shaped ferromagnetic core member are surrounded by first and second secondary windings 78a and 78b which are connected with rectifiers 80a and 80b. Diodes 82a and 82b connect the rectifiers with DC output terminals 84. The voltage across output terminals is regulated by Zener diodes 86 or some other voltage regulating means.

Optionally, the system may include an uplink data communication channel. For example, a voltage monitoring means 90 may monitor the output voltage across output terminnals 84 to be sure that the system is functioning properly. If there should be a loss of DC power, the voltage monitor 90 would provide an appropriate AC data signal to a primary winding 92 around a primary core member 94 of a data communication inductive coupler 96. A secondary core member 98 is electromagnetically coupled to the primary core member such that a secondary coil 100 wrapped therearound receives the AC communication data signal. An AC coupling means 102 superimposes the AC communication data signal on the DC electrical power conveyed by the cable B.

A communication data dector 104 detects and separates the AC communication data signal from the DC data component. An appropriate controller 106 responds to the received communication signal from the remote module D by causing the polarity control 56 to switch the polarity. In this manner, the polarity of the DC electrical power is reversed automatically to invoke the redundant, backup power transmission path in response to the voltage monitor 90 detecting that there has been an interruption in the transmitted power.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method of transmitting electrical power to equipment within a subsea module at a remote location, the method comprising:
   transmitting DC electrical power via a transmission cable from a source of DC electrical power to the remote location;
   at the remote location, passing the transmitted DC electrical power through a first rectifying means to provide DC electrical power of a first preselected polarity;
   at the remote location, converting the DC electrical power to AC electrical power having a frequency in at least the kilohertz range; and,
   transmitting the AC electrical power across a selectively separable subsea inductive coupler operatively connected with the remotely located equipment to provide electrical power thereto.

2. The power transmission method of claim 1 further including the step of filtering the DC electrical power of the first preselected polarity to remove AC components before converting the first polarity DC electrical power to AC electrical power.

3. The power transmission method of claim 1 futher including the steps of:
   at the remote location, passing the transmitted electrical power through a second rectifying means to provide DC electrical power of a second preselected polarity, the second preselected polarity being opposite to the first preselected polarity; and,
   at the remote location, converting the second polarity electrical power to high frequency AC electrical power for transmission across the inductive coupler.

4. The power transmission method as set forth in claim 3, further including the step of rectifying the AC electrical power transmitted across the inductive coupler to provide DC electrical power for the remotely located equipment within the subsea module, whereby DC power is transmitted from a source of electrical power along a power transmission cable, the DC power is converted to AC power for transmission across an inductive coupler, and the transmitted AC power is rectified back to DC electrical power for use by the remotely located equipment.

5. The power transmission method as set forth in claim 1 further including the step of rectifying the AC electrical power transmitted across the inductive coupler for providing DC electrical power to the remotely located equipment within the subsea module.

6. A method of transmitting electrical power to equipment at a remote subsea location, the method comprising:
   transmitting DC electrical power from a source of DC electrical power over an electrically conductive power transmssion cable to the remote subsea location;
   distinguishing between DC electrical power of a first polarity and an opposite, second polarity;
   at the remote location, converting the DC electrical power of either the first or second polarities to AC electrical power having a frequency in at least the kilohertz range; and,
   transmitting the AC electrical power across a magnetically coupled, selectively separable inductive coupler which is electrically connected with the remotely located equipment to provide electrical power thereto.

7. The power transmission method as set forth in claim 6 further including the step of rectifying the AC electrical power which was transmitted across the inductive coupling, whereby DC electrical power is provided and transmitted over the power cable, converted to AC to be passed across the inductive coupling, and reconverted to DC power for the remotely located equipment.

8. An apparatus for transmitting electrical power to equipment within a subsea module at a remote location, the apparatus comprising:
   a source of DC electrical power;
   a power transmission cable extending from the source of DC electrical power to the remote location;
   a first rectifying means adjacent the remote location and operatively connected with the power transmission cable for limiting the passage of power therethrough to DC power of a first polarity;
   a first DC to AC inverter means adjacent the remote location for converting the first polarity electrical power to AC electrical power having a frequency in at least the kilohertz range; and,
   a subsea inductive coupler having selectively separable first and second magnetically coupled portions, the first coupler portion being operatively connected with the DC to AC inverter means for receiving the AC electrical power therefrom and transferring the power magnetically to the second inductive coupler portion, the remotely located equipment being operatively connected with the second inductive coupler portion.

9. The power transmission apparatus as set forth in claim 8 further including a low pass filter means disposed between the first rectifier means and the first DC to AC inverter means for removing any AC components from said electrical power to said inverter means.

10. The power transmission apparatus as set forth in claim 8 further including:
    a second rectifier means adjacent the remote location and operatively connected with the power transmission cable for limiting the passage of electrical power therethrough to power of a second polarity; and,
    a second DC to AC inverter means adjacent the remote location and operatively connected with a second rectifier means for converting the second polarity electrical power to AC electrical power.

11. The power transmission apparatus as set forth in claim 10 wherein the inductive coupler first portion includes an E-shaped ferromagnetic core member having first and second windings thereround, the first and second windings being operatively connected with the first and second DC to AC inverter means.

12. The power transmission apparatus as set forth in claim 10 wherein the inductive coupler first portion includes a first primary ferromagnetic core member having a first winding at least in part therearound which first winding is electrically connected with the first DC to AC inverter and a second ferromagnetic core member having a second winding therearound, which second winding is operatively connected with the second DC to AC inverter.

13. The power transmission apparatus as set forth in claim 10 further including remote module rectifying means operatively connected with inductive coupler second portion for rectifying the electric power transmitted inductively thereacross to provide DC power to the remotely located equipment within the subsea module.

14. The power transmission apparatus as set forth in claim 8 wherein the inductive coupler includes a core comprised of a ferrite-type pot which is substantially immune to salt water corrosion.

* * * * *

UNITED STATES PATENT AND TRADEMARK OFFICE
CERTIFICATE OF CORRECTION

PATENT NO. : 4,788,448

DATED : November 29, 1988

INVENTOR(S) : Wayne D. Crowe

It is certified that error appears in the above-identified patent and that said Letters Patent is hereby corrected as shown below:

Column 3, Line 38, delete "moduel" and insert therefor --module--.

Column 4, Line 59, delete "dector" and insert therefor --detector--.

Signed and Sealed this

Fourth Day of June, 1991

*Attest:*

HARRY F. MANBECK, JR.

*Attesting Officer*     *Commissioner of Patents and Trademarks*